United States Patent
Judd (10) Patent No.: US 7,003,322 B2
(45) Date of Patent: Feb. 21, 2006

(54) ARCHITECTURE FOR DIGITAL SHARED ANTENNA SYSTEM TO SUPPORT EXISTING BASE STATION HARDWARE

(75) Inventor: Mano D. Judd, Rockwall, TX (US)

(73) Assignee: Andrew Corporation, Orland Park, IL (US)

( * ) Notice: Subject to any disclaimer, the term of this patent is extended or adjusted under 35 U.S.C. 154(b) by 467 days.

(21) Appl. No.: 10/255,409

(22) Filed: Sep. 26, 2002

(65) Prior Publication Data

US 2003/0032454 A1 Feb. 13, 2003

Related U.S. Application Data

(63) Continuation-in-part of application No. 09/928,865, filed on Aug. 13, 2001.

(51) Int. Cl.
*H04B 1/38* (2006.01)
*H04M 1/00* (2006.01)

(52) U.S. Cl. ................ 455/561; 455/524; 455/562.1; 375/345; 333/129; 343/875; 343/876; 343/893

(58) Field of Classification Search ............... 455/524, 455/561, 552.1, 562.1; 370/342; 375/345; 333/129; 343/875, 876, 893
See application file for complete search history.

(56) References Cited

U.S. PATENT DOCUMENTS

| | | | |
|---|---|---|---|
| 5,386,203 A * | 1/1995 | Ishihara | 333/129 |
| 5,646,942 A | 7/1997 | Oliver et al. | 370/112 |
| 5,666,365 A | 9/1997 | Kostreski | 370/486 |
| 5,680,142 A | 10/1997 | Smith et al. | 342/372 |
| 5,689,245 A | 11/1997 | Noreen et al. | 340/825.49 |
| 5,745,841 A | 4/1998 | Reudink et al. | 455/62 |
| 5,781,865 A * | 7/1998 | Gammon | 455/561 |
| 5,854,611 A | 12/1998 | Gans et al. | 342/373 |
| 5,872,547 A | 2/1999 | Martek | 343/815 |
| 5,880,701 A | 3/1999 | Bhame et al. | 343/890 |
| 5,884,147 A | 3/1999 | Reudink et al. | 455/67.1 |
| 5,889,494 A | 3/1999 | Reudink et al. | 342/373 |
| 5,929,823 A | 7/1999 | Martek et al. | 343/817 |
| 5,937,019 A | 8/1999 | Padovani | 375/358 |
| 5,946,622 A | 8/1999 | Bojeryd | 455/444 |
| 5,969,689 A | 10/1999 | Martek et al. | 343/758 |
| 5,991,628 A | 11/1999 | Pedziwiatr et al. | 455/443 |
| 6,005,230 A * | 12/1999 | White et al. | 219/492 |
| 6,055,230 A | 4/2000 | Feuerstein et al. | 370/335 |
| 6,070,090 A | 5/2000 | Feuerstein | 455/561 |
| 6,150,984 A | 11/2000 | Suguro et al. | 343/702 |

(Continued)

FOREIGN PATENT DOCUMENTS

EP 0 639 035 2/1995

(Continued)

OTHER PUBLICATIONS

Great Britain, *Patents Act 1977: Search Report Under Section 17*, Date of Search Jan. 23, 2004 (1 page).

(Continued)

*Primary Examiner*—William Trost
*Assistant Examiner*—Stephen D'Agosta
(74) *Attorney, Agent, or Firm*—Wood, Herron & Evans, L.L.P.

(57) ABSTRACT

A legacy support block interfaces a shared antenna system with existing base station equipment of a service provider. Processing circuitry includes digital-to-analog converter circuitry, analog-to-digital converter circuitry, a local oscillator, and mixers. A shared backhaul interfaces with the shared antenna system further consolidating of cell site equipment.

20 Claims, 4 Drawing Sheets

U.S. PATENT DOCUMENTS

| | | | |
|---|---|---|---|
| 6,157,847 A | 12/2000 | Buehrer et al. | 455/561 |
| 6,173,189 B1 | 1/2001 | Lockhart | 455/561 |
| 6,181,276 B1 | 1/2001 | Schlekewey et al. | 342/372 |
| 6,181,955 B1 | 1/2001 | Dartois | 455/562 |
| 6,185,434 B1 * | 2/2001 | Hagstrom et al. | 455/552.1 |
| 6,188,373 B1 | 2/2001 | Martek | 343/893 |
| 6,195,556 B1 | 2/2001 | Reudink et al. | 455/456 |
| 6,198,434 B1 | 3/2001 | Marktek et al. | 342/373 |
| 6,198,435 B1 | 3/2001 | Reudink et al. | 342/373 |
| 6,233,466 B1 | 5/2001 | Wong et al. | 455/562 |
| 6,236,849 B1 | 5/2001 | Reudink et al. | 455/342 |
| 6,236,866 B1 | 5/2001 | Meyer et al. | 455/562 |
| 6,246,674 B1 | 6/2001 | Feuerstein et al. | 370/334 |
| 6,252,867 B1 | 6/2001 | Pfeil et al. | 370/335 |
| 6,259,687 B1 * | 7/2001 | Lomp et al. | 370/342 |
| 6,295,026 B1 | 9/2001 | Chen et al. | 342/368 |
| 6,297,711 B1 | 10/2001 | Seward et al. | 333/129 |
| 6,317,100 B1 | 11/2001 | Elson et al. | 343/853 |
| 6,323,823 B1 | 11/2001 | Wong et al. | 343/844 |
| 6,324,405 B1 | 11/2001 | Young et al. | 455/456 |
| 6,336,033 B1 | 1/2002 | Yamaguchi et al. | 455/273 |
| 6,351,654 B1 | 2/2002 | Huang et al. | 455/562 |
| 6,360,094 B1 | 3/2002 | Satarasinghe | 455/423 |
| 6,366,789 B1 | 4/2002 | Hildebrand | 455/561 |
| 6,377,819 B1 | 4/2002 | Gesbert et al. | 455/562 |
| 6,658,263 B1 * | 12/2003 | Ke et al. | 455/524 |
| 6,775,336 B1 * | 8/2004 | Takaki | 375/345 |
| 2001/0012788 A1 | 8/2001 | Gammon | |
| 2002/0008577 A1 | 1/2002 | Cova et al. | |

FOREIGN PATENT DOCUMENTS

| | | |
|---|---|---|
| EP | 0 878 974 | 11/1998 |
| EP | 1 111 821 | 6/2001 |
| GB | 2 320 618 A | 6/1998 |
| JP | 9-98018 | 8/1997 |
| WO | WO 97/44914 | 11/1997 |
| WO | WO 98/39851 | 9/1998 |
| WO | WO 00/03479 | 1/2000 |
| WO | WO 01/06801 | 1/2001 |
| WO | WO 02/19470 A1 | 3/2002 |
| WO | WO 02/039541 A3 | 5/2002 |

OTHER PUBLICATIONS

*International Search Report*, mailed Nov. 18, 2002.
*PCS Cell Site System for Allowing a Plurality of PCS Providers to Share Cell Site Antennas*, U.S. Appl. No. 09/096,756.

* cited by examiner

PRIOR ART

ARCHITECTURE FOR DIGITAL SHARED ANTENNA SYSTEM TO SUPPORT EXISTING BASE STATION HARDWARE

CROSS-REFERENCE TO RELATED APPLICATIONS

This application is a continuation-in-part of U.S. patent application Ser. No. 09/928,865, filed Aug. 13, 2001 by Judd et al., which is incorporated by reference herein in its entirety.

FIELD OF THE INVENTION

This invention relates generally to the provision of cellular services, and specifically to the consolidation of equipment at cell sites shared among multiple service providers.

BACKGROUND OF THE INVENTION

Wireless communications services within a cellular network are provided through individual geographic areas or "cells." Historically, a cell has generally included a cellular tower, having RF antennas that communicate with a plurality of remote devices, such as cellular phones and paging devices, and a base terminal station (BTS). The BTS is linked with other facilities of a service provider, such as a switching office, for handling and processing the wireless communication traffic. The BTS may be coupled to the switching office through land lines, or alternatively, the signals may be transmitted or backhauled through microwave backhaul antennas, also located on the tower. Generally, each of the different wireless service providers, such as AT&T, Sprint, Verizon, and others, would have and maintain their own cell sites, each with a tower, RF and microwave backhaul antennas, and BTS equipment.

Recently, the acquisition of land for cell sites has become more difficult due to increased resistance from communities that are starting to vigorously protest the location of such towers in their areas due to the unsightly addition to the landscape. This is particularly so in densely populated areas where more cell sites might be needed or coverage is desired by numerous service providers.

In light of the difficulty in obtaining land and the costs to each service provider to build and maintain a cell site, many service providers have begun sharing sites and the towers located thereon. In addition, many shared cell sites are often owned by third-party companies who are driven to operate the sites as efficiently and profitably as possible.

Despite sharing a common tower, however, each service provider still typically relies upon separate RF and microwave backhaul antennas and BTS electronics. The towers used at shared sites have physical capacity limits, e.g., weight and wind loading, limiting the number of antennas for use in communicating with remote devices and backhauling for all possible service providers. Moreover, shared cell sites typically have limited space for BTS electronics, and relying upon multiple BTS electronics can raise additional issues with respect to heat dissipation and power supply.

Due to limitations in the physical capacity of the towers and the other aforementioned factors, additional consolidation of cell site equipment at a shared cell site is often desirable.

BRIEF DESCRIPTION OF THE DRAWINGS

The accompanying drawings, which are incorporated in and constitute a part of this specification, illustrate embodiments of the invention and, together with the detailed description of the embodiments given below, serve to explain the principles of the invention.

DETAILED DESCRIPTION OF EMBODIMENTS OF THE INVENTION

The invention addresses the above-noted desires and needs in the art and provides in one aspect a system for accommodating multiple service providers at a shared cell site through utilization of a shared antenna system. By doing so, often significant consolidation of cell site equipment such as antennas and other tower-mounted equipment, can be obtained. Furthermore, the invention utilizes in connection with such a shared antenna system a legacy support block that facilitates the integration of a digital shared antenna with existing, analog base terminal station (BTS) equipment that may be present at the cell site.

It is believed, in particular, that one manner of facilitating the consolidation of cell site equipment is to have third-party companies and cellular service providers use a shared antenna system, such as is set forth in the aforementioned cross-referenced application.

As described in the aforementioned application, a shared antenna system may provide electronics that allow multiple service providers to use the same antenna or group of antennas for communication with remote devices and/or microwave backhauls. In connection with such antenna sharing, beamforming and beam steering functionality may be used to individually control the shape and direction of the signal beams for each service provider, as different service providers may have different requirements for the shape of their signal beam in forming their cells and for directing a backhaul signal at a switching office. To account for the differences in the desired beams for numerous service providers and provide the ability to direct a backhaul signal, the electronics in a shared antenna system are often required to use digital signal processing to perform beamforming and beam steering, as well as other processing. Such functionality is most easily implemented in the digital domain. Consequently, it is likely that with such a shared antenna system, each service provider would need to interface with the shared antenna system using a digital interface.

Configuring BTS equipment to interface with a shared antenna system using a digital interface may be of little concern in new cell sites, as BTS equipment that interfaces using a digital interface typically may be installed to take advantage of the capabilities of a shared antenna system. However, when adding a shared antenna system to an existing cell site that uses BTS equipment having an analog interface, it is believed that service providers may be reluctant to scrap or replace existing BTS hardware, as such hardware would ordinarily not be capable of being interfaced directly to a shared antenna system that relies on a digital interface.

Thus, in facilitating the consolidation of cell site equipment, it may be desirable for a service provider to be able to interface existing BTS equipment using an analog interface with a shared antenna system that relies on a digital interface.

In this regard, one aspect of the present invention addresses interfacing existing analog-based BTS equipment with a digital-based antenna shared among multiple service providers. Such an interface is realized by the use of a legacy support block intermediate a shared antenna system and existing BTS equipment. Moreover, as will become more apparent below, many of the concepts discussed herein are applicable to the RF link systems on a shared tower, as well as the microwave backhaul systems on the same tower.

While the invention described herein is described in connection with various embodiments, it is understood that the invention is not limited to those particular embodiments. Rather, the description of the invention is intended to cover various alternatives, modifications, and equivalent arrangements as may be included within the scope of the invention as defined by the application.

Figure 1:
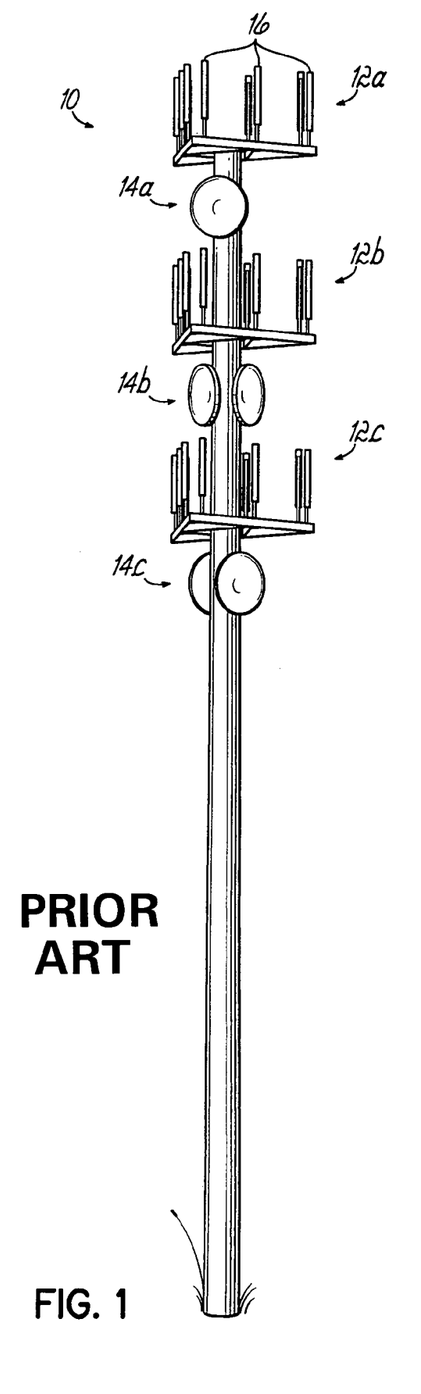
FIG. 1 is a perspective view of a traditional cellular tower.

FIG. 1 shows a perspective view of a typical base station cellular tower 10 having RF link and microwave backhaul equipment of multiple service providers thereon for facilitating wireless communication consistent with historical wireless technology. Tower 10 may be owned by a tower operator who desires to sell or rent use of the tower to wireless service providers such as AT&T, Sprint, and Verizon, to name just a few possible service providers.

Tower 10 includes one or more sets of RF link antennas, 12a, 12b, and 12c, each corresponding to a service provider, for providing the wireless communication link between the base station of tower 10 and a plurality of remote devices, such as cellular phones, pagers, and other wireless devices. Also associated with the tower are one or more backhaul antennas, or sets of antennas, indicated by reference numerals 14a, 14b, and 14c, which provide microwave backhaul of the communication signals, such as to a switching office for a service provider, or to another tower. The tower will usually include one or more land lines (not shown) such as for communication with the switching office or a remote location. Also associated with tower 10, but not shown in FIG. 1, are base station electronics, usually located at the base of the tower, which encompass any of the electronics not included at the antennas or up on the tower for processing wireless communications. Cables running from the various RF link antennas 12a–12c and microwave backhaul antennas 14a–14c run down to the electronics at the base of the tower adding additional weight and wind load, over that associated with the antennas.

An RF link 12a will include sets of RF antennas 16 with each set facing a portion or sector of a cell associated with tower 10. In FIG. 1, a tower defining three sectors is illustrated, although other numbers of sectors might also be defined by the tower. Generally, FIG. 1 shows three RF antenna structures 16 facing each of three defined sectors. Furthermore, based upon the orientation of the RF link 12a–12c on the tower, each RF link is generally shown to be oriented to service a similar sector. Alternatively, the various links 12a–12c might be oriented at different angles around a 360° axis of the tower 10 so that different sectors are defined by each RF link 12a–12c.

The microwave backhaul antennas 14a–14c are illustrated as being directed in various different directions. In that way, the microwave backhaul signals are sent to multiple points from the single tower point to backhaul signals to those multiple points, such as multiple switching offices, or to other towers. Tower 10 and the associated RF link and microwave backhaul will generally operate within allocated frequency bands which are recognized or authorized by governmental bodies such as the Federal Communications Commission (FCC), or any similar foreign counterparts, such as the European Telecommunications Standardization Institute (ETSI) in Europe, which are intended for use for wireless and microwave communications. Similarly, the present invention is directed for operation in various conventional wireless and microwave bands used for RF links and microwave backhaul.

Figure 2:
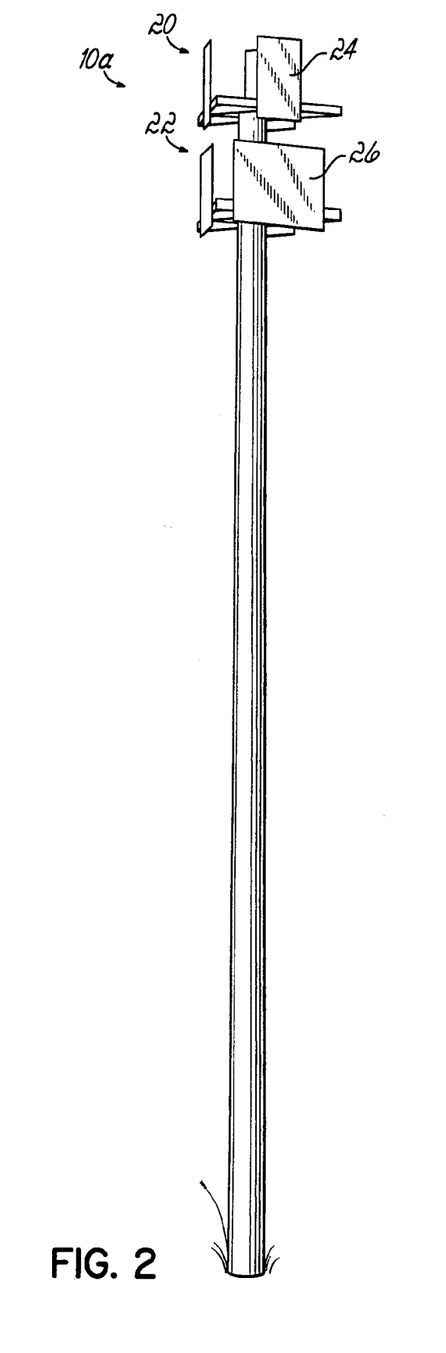
FIG. 2 is a perspective view of a cellular tower incorporating an embodiment of the present invention.

FIG. 2 illustrates a cell tower incorporating various embodiments of the present invention. The shared antenna system of the invention provides an array 20 of RF link sector antennas 24, each of which is to be shared by multiple service providers. Each individual RF sector antenna 24 provides multiple and simultaneous individual signal beams in the sector for each individual service provider using the array. That is, the beams provided for each service provider are specifically tailored according to the direction and performance criteria set forth by that service provider. Additionally, digital beam steering is provided so that each service provider has flexibility with respect to their multiple beams for all sectors serviced by the tower 10a.

Similarly, the array 22 of microwave backhaul sector antennas 26 provides multiple, simultaneous beams in each sector in different directions which provide the desired point-to-multipoint characteristics which are necessary for the microwave backhaul signals to reach the various locations remote from the tower (e.g., switching offices, other cell towers, etc.). Those skilled in the art will appreciate that digital nulling may be advantageously incorporated into the backhaul. Digital beam steering is also provided for the microwave backhaul beams of each service provider and each sector antenna 26 to provide flexibility in the microwave backhaul operation.

The sharing of the array of sector antennas for both the RF links and the microwave backhaul reduces the operation costs for the operator, because such costs are spread out over a greater number of service providers. As will become more apparent below, the present invention allows the use of existing BTS equipment further reducing costs and increasing the utility of shared antenna systems.

Figure 3:
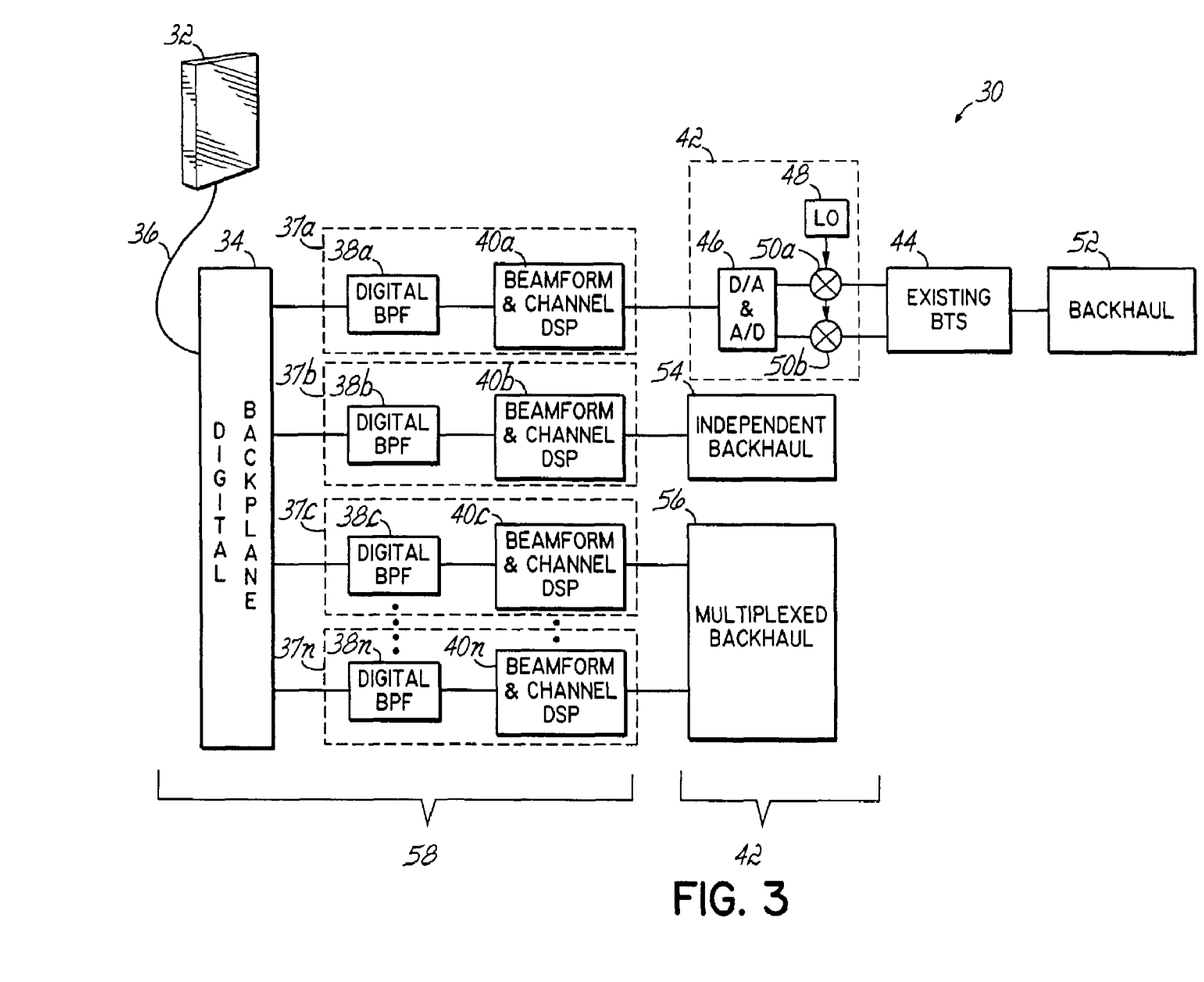
FIG. 3 is a circuit block diagram of an embodiment of the present invention interfacing with a shared antenna system incorporating an active sector array.

FIG. 3 illustrates a basic circuit schematic diagram of one embodiment of the invention having a legacy support block that allows multiple service providers to interface existing BTS equipment with an active sector array. The embodiments, as illustrated herein, in accordance with the various aspects of the invention, may be utilized for the multiple sectors and sector antennas 24 associated with the RF link array 20 and/or with the multiple sectors and sector antennas 26 associated with microwave backhaul array hardware 22 (FIG. 2). To that end, in one embodiment of the invention, only the RF link hardware may incorporate the invention whereas the microwave backhaul is handled conventionally. Similarly, in another embodiment, microwave backhaul hardware may incorporate the present invention, whereas the RF link is handled conventionally. Alternatively, both the RF link and microwave backhaul may be handled in accordance with the aspects of the invention.

System 30, as shown in FIG. 3, comprises shared antenna system 58 and a legacy support block 42. Antenna system 58 utilizes an active sector array 32 of elements that are operable to define multiple, individual beams for one or more service providers. Array 32 may resemble RF link sector antennas 24, shown in FIG. 2. Active sector array 32 may advantageously include a plurality of cross-polarized antenna elements, one or more multicarrier power amplifiers (MCPAs), one or more low noise amplifiers (LNAs), RF to intermediate frequency (IF) transceivers, analog-to-digital (A/D) and digital-to-analog (D/A) converters, and/or fiber converters, all of which may be located proximate the top of a tower, such as tower 10a (see FIG. 2).

Active sector array 32 couples to a digital backplane 34 via an optical fiber 36. Those skilled in the art will appreciate that other forms of interconnection, e.g., wire, cables, etc., may be used without departing from the spirit of the present invention.

Digital backplane 34 couples to a plurality of interface circuits 37a–n. Each interface circuit 37a–n is configured to process service provider specific digital signals for use in the transmission and reception of provider specific data using the array 32. Each interface circuit 37a–n comprises a digital bandpass filter 38a–n and beamforming and channel digital signal processing (DSP) block 40a–n (wherein "n" designates the total number of channels or service providers).

Each interface circuit 37a–n functions as a service connection point for various service providers, such as AT&T, Sprint, and Verizon, to name just a few possible service providers. Each beamforming and channel DSP processing block 40a–n provides the beam and channel characteristics desired by a particular service provider. A further discussion of antenna system 58 may be found in the aforementioned cross-referenced application.

One or more of the interface circuits 37a–n may couple with a legacy support block for an existing BTS. For purposes of illustration, a legacy support block 42 for existing BTS 44 is shown for channel (a). BTS 44 may couple to a backhaul 52. Those skilled in that art will appreciate that additional legacy support blocks for additional existing BTS coupled to similar backhauls or landlines may be added as desired.

Legacy support block 42 comprises digital-to-analog (D/A) and analog-to-digital (A/D) converter 46, local oscillator (LO) 48, and mixers 50a, 50b. D/A and A/D converter 46 has a digital side and an analog side. The digital side of D/A and A/D converter 46 couples to beamforming and channel DSP block 40a. The analog side couples to mixers 50a, 50b.

D/A and A/D converter 46 converts between a digital signal processed by beamforming and channel DSP 40a and a mixed analog signal processed by existing BTS 44. Moreover, the D/A section of converter 46 is generally attributed to the uplink or receive side of the circuit, providing a digital-to-analog conversion, whereas the A/D section of converter 46 is generally attributed to the downlink or transmit side of the circuit, providing an analog-to-digital conversion. In addition, those skilled in the art will appreciate that D/A and A/D converter 46 may be a single integrated circuit or a combination of integrated circuits or some other circuit that provides like functionality.

As mentioned, the analog side of D/A and A/D converter 46 is coupled to mixers 50a, 50b. Also coupled to mixers 50a, 50b is LO 48. As will be appreciated by those skilled in the art, mixers 50a, 50b, used in conjunction with LO 48, convert analog signals to and from D/A and A/D converter 46 to frequencies that are usable by existing BTS 44.

Hereinafter, the signals associated with active sector array 32 are referred to as "digital signals," and they are of a form for transmitting and receiving information through the active sector array 32. Similarly, the digital signals are converted to or from receive or transmit analog baseband signals, referred to generally as baseband signals, of a form for transmitting and receiving information through a BTS. The nomenclature utilized is not to any way to limit the invention, but rather, is used to refer to the signals at different stages of their processing.

As will be understood by those skilled in the art, additional stages of mixers and conversion steps may be incurred as necessary for converting a digital signals to receive baseband signals utilized by a BTS and for converting baseband transmit signals of a BTS to digital signal utilized by a shared antenna system. Furthermore, the individual mixers 50a, 50b are actually representative of the up-conversion and down-conversion which would occur in transmit and receive paths as illustrated individually in FIG. 3. Those skilled in the art will also appreciate that other circuit arrangements providing similar functionality to LO 48 and mixers 50a, 50b may be used without departing from the spirit of the present invention.

Optionally, or in addition, one or more channels may couple with an independent or multiplexed backhaul. For example, channel (b) is illustrated coupling to an independent backhaul 54. Channels (c–n) are illustrated as coupling to a multiplexed backhaul 56. Thus, antenna system 58 may provide a digital signal having individual characteristics, and associated with each service provider's backhaul irrespective of whether the backhaul is independent or multiplexed. Moreover, a service provider may initially utilize a legacy support block in conjunction with an existing BTS and associated backhaul, and later upgrade the backhaul used therewith to a digital backhaul, which would then necessitate only the removal of the original BTS hardware and the legacy support block, and the installation of the new, digital backhaul in their place.

In operation, when receiving a signal from active sector array 32, D/A portion of converter 46 converts the digital signal from the array 32 to an analog signal. The analog signal is then mixed with a local oscillator signal from LO 48 in mixer 50b to provide a receive baseband analog signal that may be utilized by existing BTS 44. Conversely, when transmitting a signal from active sector array 32, BTS 44 provides a transmit baseband analog signal that is mixed with a local oscillator signal from LO 48 in mixer 50a and converted to a digital signal in A/D portion of converter 46 to provide a digital signal to the array 32.

Thus, legacy support block 42 provides an interface between a service provider's existing BTS 44 having baseband signals and an active sector array 32 having digital signals, and capable of being shared among multiple service providers.

Alternatively, the antenna array may be a passive antenna array wherein the one or more multicarrier power amplifiers (MCPAs), one or more low noise amplifiers (LNAs), RF to intermediate frequency (IF) transceivers, analog-to-digital (A/D) and digital-to-analog (D/A) converters, and/or fiber converters are located elsewhere, such as at the base of the tower, or removed from the antenna as discussed further hereinbelow with respect to FIG. 4.

Figure 4:
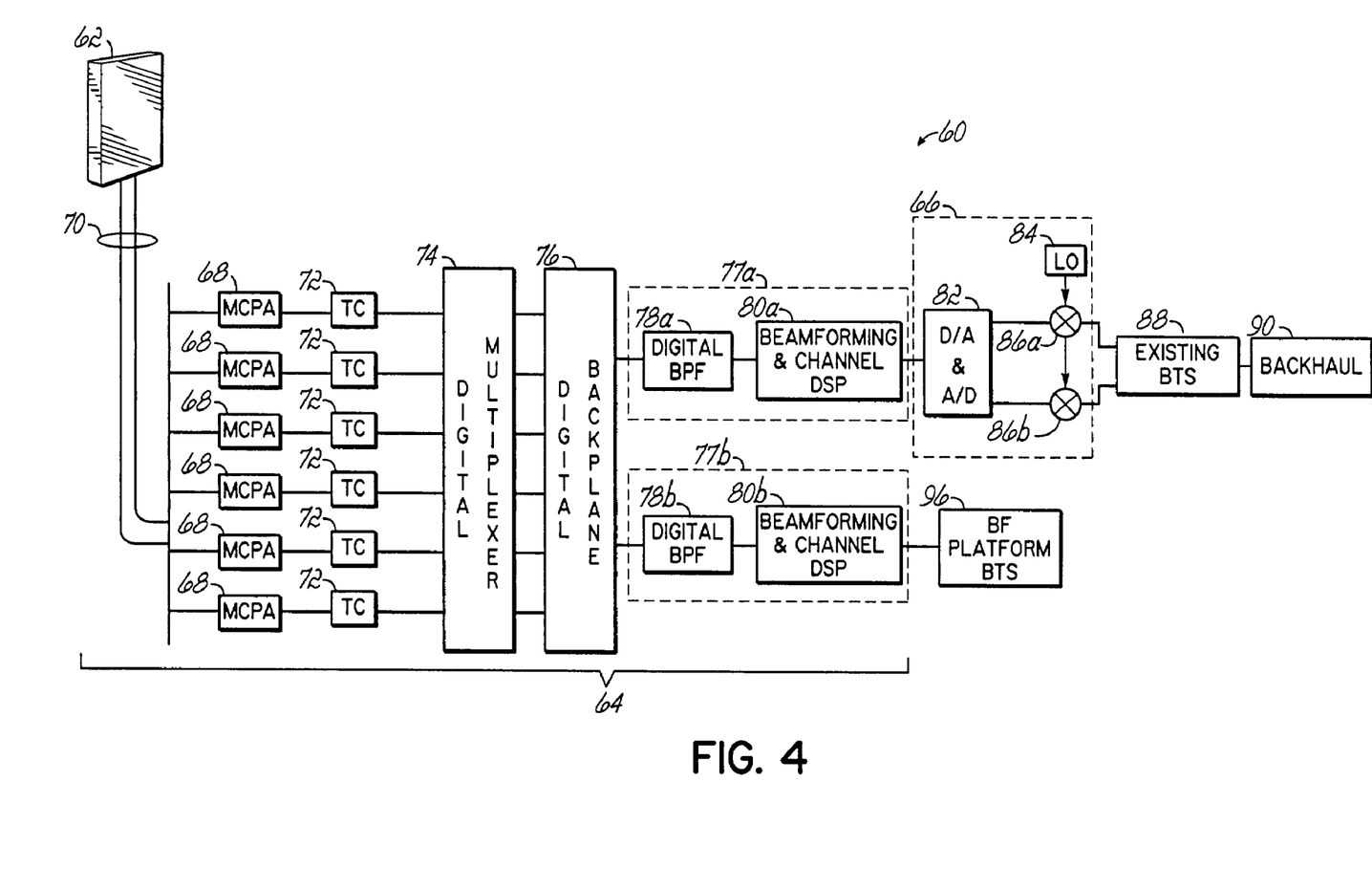
FIG. 4 is a circuit block diagram of an embodiment of the present invention interfacing with a shared antenna system incorporating a passive sector array.

In particular, FIG. 4 illustrates another alternative embodiment of the invention, similar to the general illustration in FIG. 3, wherein an antenna array 62 with passive antenna elements is utilized at the top of the tower rather than a distributed active antenna. Coaxial cables 70, at least one for each column, are directed down the tower in the conventional fashion, and the amplification circuitry, frequency converter circuitry, filtering circuitry, and digital signal processing circuitry is at the base of the tower or beyond the base of the tower. In that way, shared antenna functionality may be retrofitted into existing cell tower structures utilizing passive antenna elements.

Moreover, FIG. 4 illustrates a basic circuit schematic diagram of one embodiment of the invention having a legacy support block 66 that allows multiple service providers to interface existing BTS equipment with a passive sector array. The embodiments, as illustrated in conjunction with FIG. 4, may also be utilized for the multiple sectors and sector antennas 24 associated with the RF link array 20 and/or with the multiple sectors and sector antennas 26 associated with microwave backhaul array hardware 22 (FIG. 2).

System 60, as shown in FIG. 4, comprises shared antenna system 64 and a legacy support block 66. Antenna system 64 utilizes a passive sector array 62 of elements that are operable to define multiple, individual beams for one or more service providers. Array 62 may resemble RF link sector antennas 24, shown in FIG. 2. Passive sector array 62 may advantageously include a plurality of cross-polarized antenna elements and one or more low noise amplifiers (LNAs). In other embodiments of the present invention, one or more LNAs may be located proximate the base of a tower.

Passive sector array 62 couples to a plurality of multi-channel power amplifiers (MCPAs) 68 via a bundle of coaxial cables 70. MCPAs 68 couple to a plurality of respective transceivers 72. Transceivers 72 couple through a digital multiplexer 74 to a digital backplane 76.

Digital backplane 76 couples to a plurality of interface circuits 77a–b. Each interface circuit 77a–b is configured to process service provider specific digital signals for use in the transmission and reception of provider specific data using the array 62. Each interface circuit 77a–b comprises a digital bandpass filter 78a–b and beamforming and channel DSP block 80a–b.

Each interface circuit 77a–b serves as a service connection point to various service providers' BTS equipment. For example, digital bandpass filter (BPF) 78a and digital beamforming processing block 80a are provided intermediate the backplane 76 and legacy support block 66 to interface between the digital signals associated with passive sector array 62 and the analog signals of an existing BTS 88.

Digital bandpass filter 78a isolates and defines individual portions of the digital signals corresponding to the antenna signals of the individual service provider associated with existing BTS 88. Digital beamforming processing block 80a advantageously defines the azimuth plane of the antenna signals associated with the individual service provider associated with existing BTS 88. BTS 88 may include an existing backhaul as indicated at reference numeral 90 or land lines (not shown).

Optionally, an interface circuit 77b may serve as a connection point for a digital or beamforming platform BTS 96. This is also accomplished through a digital bandpass filter 78b defining individual portions of the digital signals associated with beamforming platform BTS 96 and a digital beamforming processing block 80b providing the desired beam characteristics as required by the service provider associated with beamforming platform BTS 96.

Further discussion associated with an antenna, such as shared antenna system 64, may also be found in the aforementioned cross-referenced application.

Legacy support block 66 comprises D/A and A/D converter 82, local oscillator (LO) 84 and mixers 86a, 86b. D/A and A/D converter 82 has a digital side and an analog side. The digital side couples to beamforming and channel DSP block 80. The analog side couples to mixers 86a, 86b. D/A and A/D converter 82 converts between a digital signal processed by beamforming and channel DSP block 80 and a mixed analog signal processed by existing BTS 88. Moreover, the A/D section of converter 82 is associated with the downlink or receive side of the circuit whereas the D/A section is associated with the uplink or transmit side of the circuit.

LO 84 is also coupled to mixers 86a, 86b. Mixer 86a, 86b used in conjunction with LO 84, convert analog signals to and from D/A and A/D converter 82 to frequencies that are capable of being processed by existing BTS 88.

In operation, when receiving a signal from antenna 64, D/A portion of converter 82 converts the digital signal from the array 62 to an analog signal. The analog signal is then mixed with a local oscillator signal from LO 84 in mixer 86b to provide a receive baseband analog signal that may be utilized by existing BTS 88. Conversely, in transmitting a signal from antenna 64, BTS 88 provides a transmit baseband analog signal that is mixed with a local oscillator signal from LO 84 in mixer 86a and converted to a digital signal in A/D portion of converter 82 to provide a digital signal to the antenna 64.

As will be understood by a person of ordinary skill in the art, additional stages of mixers and conversion steps may be incurred as necessary for converting the antenna signal to receive baseband signals utilized by a BTS and for converting baseband transmit signals of a BTS to a digital signal utilized by a digital shared antenna. Furthermore, mixers 86a, 86b are actually representative of up-conversion and down-conversion processes that occur in the transmit and receive paths as illustrated in FIG. 4. Moreover, the D/A portion of block 82 is generally attributed to the uplink or receive side of the circuit, whereas the A/D portion of block 82 is generally attributed to the downlink or transmit side of the circuit.

The signals associated with antenna 64 are referred to herein as "digital signals," and they are of a form for transmitting and receiving information through the passive sector array 62. The digital signals are converted to or from receive or transmit analog baseband signals are referred to generally as baseband signals to distinguish them from the digital signal associated with shared digital antenna signals. The nomenclature utilized is not to any way to limit the invention, but rather, is used to refer to the signals at different stages of their processing. Thus, legacy support block 66 functions to provide an interface between a shared antenna system 64 and an existing BTS 88.

Figure 5:
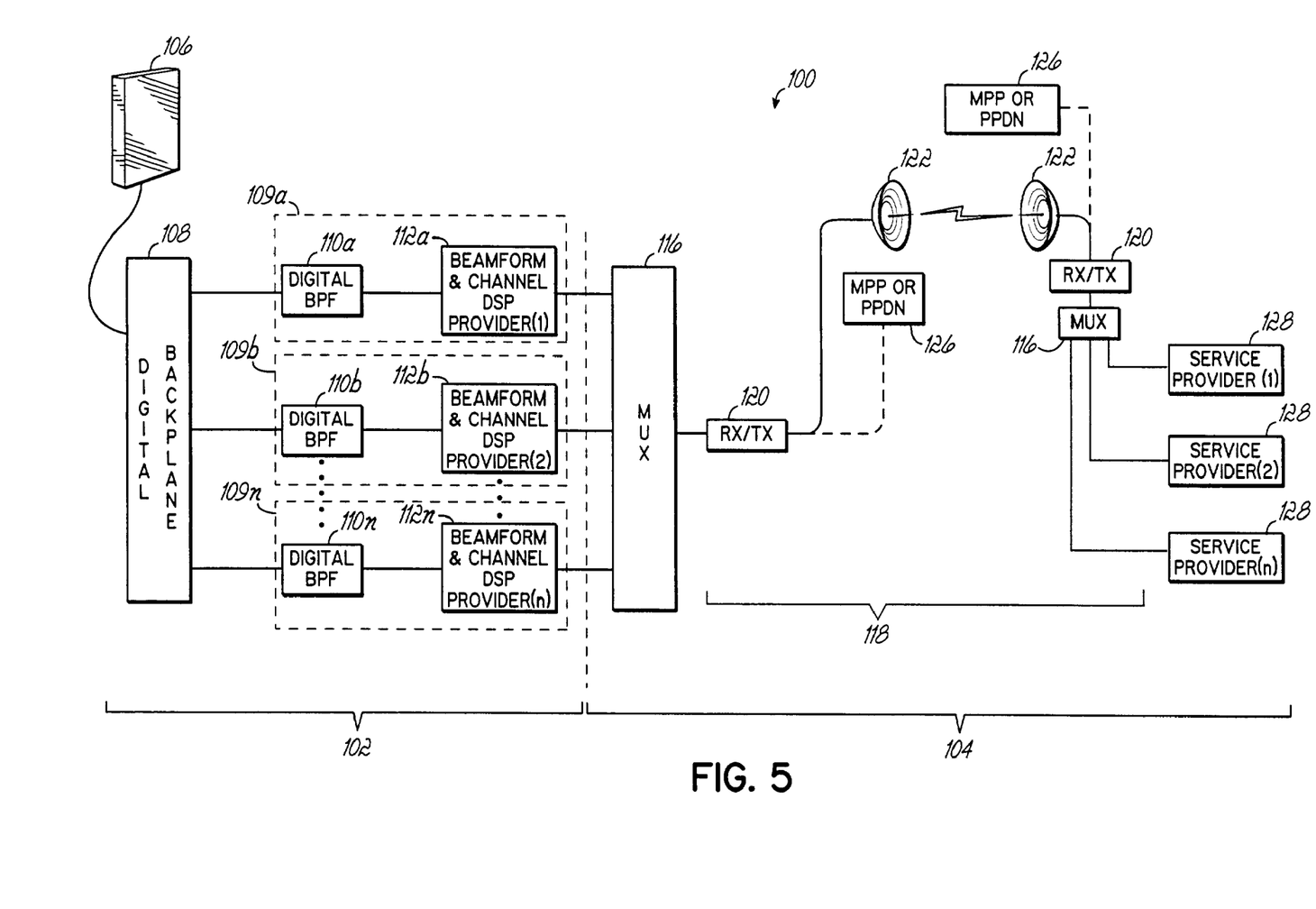
FIG. 5 is a circuit block diagram of an embodiment of the present invention utilizing a shared backhaul.

FIG. 5 further illustrates a shared backhaul aspect of the present invention, previously illustrated at 56 in FIG. 3. Thus, in addition or in lieu of the features of the present invention discussed in conjunction with FIGS. 3 and 4, embodiments of the present invention may include a shared backhaul. A shared backhaul reduces service provider costs by allowing a reduction in the number of backhaul antennas required to support multiple wireless service providers in a digital shared antenna system.

System 100, as shown in FIG. 5, comprises shared digital antenna 102 and a shared backhaul 104. Antenna 102 may be an active antenna as illustrated in the embodiments of FIG. 3 or a passive antenna as illustrated in the embodiments of FIG. 4.

Antenna 102 comprises a sector antenna 106, a digital backplane 108 and a plurality of interface circuits 109a–n. Each interface circuit 109a–n comprises a digital bandpass filter 110a–n and beamforming and channel DSP blocks 112a–n. Sector antenna 106 may resemble RF sector antenna 24 shown in FIG. 2. Digital bandpass filters 110a–n isolate and define individual portions of the digital signals corresponding to the antenna signals of the individual service providers 128a–n associated with the shared backhaul. Beamforming and channel DSP blocks 112a–n provide the individual service providers 128a–n associated with shared backhaul 104 desired beam characteristics.

Further discussion associated with an antenna, such as antenna 102, may also be found in the aforementioned cross-referenced application.

As illustrated, shared backhaul 104 comprises multiplexers 116 and a microwave backhaul transceiver and antenna system 118. Antenna system 118 comprises a pair of transceivers 120 and a pair of antennas 122. Antennas 122 may resemble microwave backhaul antenna 14a, shown in FIG. 1.

Shared backhaul 104 multiplexes the signals from the plurality of beamformer and channel DSP blocks 112, coupling the signals to a microwave backhaul transceiver 120 in antenna system 118, whereby the signals are linked to their respective service providers 128.

Alternatively, a multipoint-to-point (MPP) or point-to-point with digital nulling (PPDN) antenna configuration may be used as shown at reference numeral 126 and indicated by dashed lines to represent fiber interconnections. Antennas 126 may resemble microwave backhaul sector antenna 26, shown in FIG. 2. Multiplexers 116 may be time division multiplexers, as are well known in the art.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. An apparatus, comprising:
    a shared antenna system configured to communicate provider specific data associated with a plurality of service providers in a digital format, wherein the shared antenna system comprises:
        an array of antenna elements;
        a digital backplane; and
        a plurality of interface circuits, each coupled to the array of antenna elements through the digital backplane and configured to process service provider specific digital signals for use in at least one of transmission and reception of provider specific data using the array of antenna elements; and,
    a legacy support block configured to interface the shared antenna system with existing base station equipment of a first service provider among the plurality of service providers that is configured to communicate data in an analog format.

2. The apparatus of claim 1, further comprising a shared backhaul coupled to the shared antenna system.

3. The apparatus of claim 1, wherein the array of antenna elements is configured as at least one active sector array.

4. The apparatus of claim 3, wherein the shared antenna system comprises a plurality of interface circuits coupled to the at least one active sector array through an optical fiber.

5. The apparatus of claim 1, wherein the array of antenna elements is configured as at least one passive sector array.

6. The apparatus of claim 5, wherein the shared antenna system comprises:
    a plurality of multichannel power amplifiers coupled to the at least one passive active sector array;
    a plurality of transceivers coupled to the plurality of multichannel power amplifiers; and
    a digital multiplexer coupled to the plurality of transceivers.

7. The apparatus of claim 6, wherein the passive sector array is coupled to the plurality of multichannel power amplifiers through a plurality of coaxial cables.

8. The apparatus of claim 1, wherein at least one of the plurality of interface circuits is configured to bandpass filter a service provider specific digital signal.

9. The apparatus of claim 1, wherein at least one of the plurality of interface circuits is configured to control a beamwidth of a service provider specific beam radiated by the array of antenna elements.

10. The apparatus of claim 1, wherein at least one of the plurality of interface circuits is configured to steer a service provider specific beam radiated by the array of antenna elements.

11. The apparatus of claim 1, wherein at least one of the plurality of interface circuits is configured to perform channelization on a service provider specific signal.

12. The apparatus of claim 1, wherein the legacy support block comprises:
    digital-to-analog converter circuitry coupled to the shared antenna system and configured to convert a first digital signal associated with the first service provider to a first analog signal;
    a local oscillator;
    a first mixer coupled to the digital-to-analog converter and the local oscillator and configured to frequency convert the first analog signal to a baseband receive signal capable of being processed by the existing base station equipment;
    a second mixer coupled to the existing base station equipment and the local oscillator and configured to frequency convert a transmit baseband signal processed by the existing base station equipment to a second analog signal; and,
    analog-to-digital converter circuitry coupled to the second mixer and configured to convert the second analog signal to second digital signal capable of being processed by the antenna and associated with the first service provider.

13. The apparatus of claim 1, further comprising a digital base terminal station associated with a second service provider, the digital base terminal station coupled to the shared antenna system.

14. The apparatus of claim 1, further comprising a multiplexed backhaul associated with at least two service providers, the multiplexed backhaul coupled to the shared antenna system.

15. A method of installing a shared antenna system at an existing cell site, wherein the cell site includes base terminal station hardware associated with a first service provider, the base terminal station hardware configured to process baseband analog transmit and receive signals, the method comprising the steps of:
    installing a shared antenna system, the shared antenna system configured to process a digital signal associated with the first service provider, and wherein the shared antenna system comprises an array of antenna elements, a digital backplane; and a plurality of interface circuits, each coupled to the array of antenna elements through the digital backplane and configured to process service provider specific digital signals for use in at least one of transmission and reception of provider specific data using the array of antenna elements; and, interfacing the shared antenna system with the base terminal station hardware by installing a legacy support block intermediate the shared antenna system and the base terminal station hardware, the legacy support block performing analog-to-digital and digital-to-analog conversion.

16. An apparatus, comprising:
a shared antenna system configured to communicate provider specific data associated with a plurality of service providers in a digital format, wherein the shared antenna system comprises:
an array of antenna elements; and
a plurality of interface circuits, each coupled to the array of antenna elements and configured to process service provider specific digital signals for use in at least one of transmission and reception of provider specific data using the array of antenna elements, wherein at least one of the plurality of interface circuits is configured to control a beamwidth of a service provider specific beam radiated by the array of antenna elements; and,
a legacy support block configured to interface the shared antenna system with existing base station equipment of a first service provider among the plurality of service providers that is configured to communicate data in an analog format.

17. The apparatus of claim 16, wherein the shared antenna system further comprises a digital backplane, and wherein the plurality of interface circuits are coupled to the array of antenna elements through the digital backplane.

18. An apparatus, comprising:
a shared antenna system configured to communicate provider specific data associated with a plurality of service providers in a digital format, wherein the shared antenna system comprises:
an array of antenna elements; and
a plurality of interface circuits, each coupled to the array of antenna elements and configured to process service provider specific digital signals for use in at least one of transmission and reception of provider specific data using the array of antenna elements, wherein at least one of the plurality of interface circuits is configured to steer a service provider specific beam radiated by the array of antenna elements; and,
a legacy support block configured to interface the shared antenna system with existing base station equipment of a first service provider among the plurality of service providers that is configured to communicate data in an analog format.

19. The apparatus of claim 18, wherein the shared antenna system further comprises a digital backplane, and wherein the plurality of interface circuits are coupled to the array of antenna elements through the digital backplane.

20. A method of installing a shared antenna system at an existing cell site, wherein the cell site includes base terminal station hardware associated with a first service provider, the base terminal station hardware configured to process baseband analog transmit and receive signals, the method comprising the steps of:
installing a shared antenna system, the shared antenna system configured to process a digital signal associated with the first service provider, and wherein the shared antenna system comprises an array of antenna elements and a plurality of interface circuits, each interface circuit coupled to the array of antenna elements and configured to process service provider specific digital signals for use in at least one of transmission and reception of provider specific data using the array of antenna elements, wherein at least one of the plurality of interface circuits is configured to control at least one of a beamwidth and a direction of a service provider specific beam radiated by the array of antenna elements; and,
interfacing the shared antenna system with the base terminal station hardware by installing a legacy support block intermediate the shared antenna system and the base terminal station hardware, the legacy support block performing analog-to-digital and digital-to-analog conversion.

* * * * *